United States Patent
Gibbs et al.

(10) Patent No.: US 7,339,609 B2
(45) Date of Patent: Mar. 4, 2008

(54) SYSTEM AND METHOD FOR ENHANCING REAL-TIME DATA FEEDS

(75) Inventors: Simon Gibbs, San Jose, CA (US); Hubert Le Van Gong, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 502 days.

(21) Appl. No.: 10/215,984

(22) Filed: Aug. 8, 2002

(65) Prior Publication Data

US 2003/0030727 A1 Feb. 13, 2003

Related U.S. Application Data

(60) Provisional application No. 60/311,477, filed on Aug. 10, 2001.

(51) Int. Cl.
*H04N 7/18* (2006.01)

(52) U.S. Cl. ..................................................... 348/157

(58) Field of Classification Search ............... 348/143, 348/208, 241, 148, 239, 158, 578, 598, 589, 348/600, 159, 153, 584, 591, 587, 171, 172, 348/157, 557, 61, 169, 155; 382/104, 307, 382/154, 275, 141; 386/107; 396/429; 463/40, 41, 42; 725/105
See application file for complete search history.

(56) References Cited

U.S. PATENT DOCUMENTS

| | | |
|---|---|---|
| 4,716,458 A | 12/1987 | Heitzman et al. |
| 4,970,666 A | 11/1990 | Welsh et al. |
| 5,398,075 A | 3/1995 | Freytag et al. |
| 5,457,370 A | 10/1995 | Edwards |
| 5,577,188 A | 11/1996 | Zhu |
| 5,600,368 A | 2/1997 | Matthews et al. |
| 5,673,401 A | 9/1997 | Volk et al. |
| 5,689,442 A * | 11/1997 | Swanson et al. ............. 380/241 |
| 5,729,471 A | 3/1998 | Jain et al. |
| 5,742,521 A | 4/1998 | Ellenby et al. |
| 5,745,126 A * | 4/1998 | Jain et al. .................... 382/154 |
| 5,838,310 A | 11/1998 | Uya |
| 5,850,232 A | 12/1998 | Engstrom et al. |
| 5,860,862 A | 1/1999 | Junkin |
| 5,878,174 A | 3/1999 | Stewart et al. |
| 5,900,868 A | 5/1999 | Duhault et al. |
| 5,912,700 A * | 6/1999 | Honey et al. ................ 348/157 |
| 5,966,132 A | 10/1999 | Kakizawa et al. |
| 6,031,545 A | 2/2000 | Ellenby et al. |
| 6,044,397 A | 3/2000 | Eleftheriadis et al. |
| 6,067,653 A | 5/2000 | Tsukagoshi |
| 6,072,504 A | 6/2000 | Segen |

(Continued)

FOREIGN PATENT DOCUMENTS

WO    WO 00/67867    11/2000

*Primary Examiner*—Tung Vo
*Assistant Examiner*—Behrooz Senfi
(74) *Attorney, Agent, or Firm*—Blakely, Sokoloff, Taylor & Zafman LLP (57) ABSTRACT

The invention illustrates a system and method of processing an instrumentation data stream comprising: a sensor for generating an instrumentation data stream; a data collector configured for receiving the instrumentation data stream; and a normalization module configured for formatting portions of the instrumentation data stream into a common standard.

12 Claims, 5 Drawing Sheets

U.S. PATENT DOCUMENTS

| | | |
|---|---|---|
| 6,080,063 A | 6/2000 | Khosla |
| 6,133,962 A | 10/2000 | Proehl et al. |
| 6,147,716 A | 11/2000 | Ohki |
| 6,151,009 A | 11/2000 | Kanade et al. |
| 6,178,007 B1 | 1/2001 | Harrington |
| 6,193,610 B1 | 2/2001 | Junkin |
| 6,219,011 B1 | 4/2001 | Aloni et al. |
| 6,266,100 B1 | 7/2001 | Gloudemans et al. |
| 6,282,317 B1 | 8/2001 | Luo et al. |
| 6,295,115 B1 | 9/2001 | Zhang et al. |
| 6,330,486 B1* | 12/2001 | Padula ............... 700/94 |
| 6,359,585 B1 | 3/2002 | Bechman et al. |
| 6,384,871 B1 | 5/2002 | Wilf et al. |
| 6,408,257 B1 | 6/2002 | Harrington et al. |
| 6,414,696 B1 | 7/2002 | Ellenby et al. |
| 6,445,815 B1 | 9/2002 | Sato |
| 6,466,250 B1 | 10/2002 | Hein et al. |
| 6,483,523 B1 | 11/2002 | Feng |
| 6,525,780 B1* | 2/2003 | Bruno et al. ............ 348/578 |
| 6,535,226 B1 | 3/2003 | Sorokin et al. |
| 6,545,705 B1 | 4/2003 | Sigel et al. |
| 6,571,054 B1 | 5/2003 | Tonomura et al. |
| 6,593,936 B1 | 7/2003 | Huang et al. |
| 6,597,406 B2* | 7/2003 | Gloudemans et al. ....... 348/587 |
| 6,642,939 B1 | 11/2003 | Vallone et al. |
| 6,674,461 B1 | 1/2004 | Klapman |
| 6,681,395 B1 | 1/2004 | Nishi |
| 6,707,456 B1 | 3/2004 | Marrin et al. |
| 6,741,241 B1 | 5/2004 | Jaubert et al. |
| 6,771,272 B2 | 8/2004 | Deering |
| 6,778,085 B2* | 8/2004 | Faulkner et al. ............ 340/541 |
| 6,791,574 B2 | 9/2004 | Hoch et al. |
| 6,850,250 B2* | 1/2005 | Hoch ................. 345/632 |
| 6,860,806 B2 | 3/2005 | Kojima et al. |
| 2001/0003715 A1* | 6/2001 | Jutzi et al. .................... 463/40 |
| 2001/0012324 A1 | 8/2001 | Normile |
| 2001/0023202 A1 | 9/2001 | Okubo |
| 2002/0010928 A1 | 1/2002 | Sahota |
| 2002/0027617 A1 | 3/2002 | Jeffers et al. |
| 2002/0064764 A1 | 5/2002 | Fishman et al. |
| 2002/0069265 A1 | 6/2002 | Bountour et al. |
| 2002/0090217 A1* | 7/2002 | Limor et al. ............... 396/429 |
| 2002/0152462 A1* | 10/2002 | Hoch et al. ................ 725/37 |
| 2003/0038892 A1 | 2/2003 | Wang et al. |
| 2003/0169335 A1* | 9/2003 | Monroe .................. 348/143 |
| 2004/0107439 A1 | 6/2004 | Hassell et al. |
| 2004/0135677 A1* | 7/2004 | Asam .................. 340/425.5 |
| 2005/0162515 A1* | 7/2005 | Ventianer et al. ........... 348/143 |

* cited by examiner

SYSTEM AND METHOD FOR ENHANCING REAL-TIME DATA FEEDS

CROSS REFERENCE TO RELATED APPLICATIONS

The application claims relating from the U.S. provisional application entitled "Method and Apparatus for Mixed Reality Broadcast" filed on Aug. 10, 2001, with Ser. No. 60/311,477, which is herein incorporated by reference.

FIELD OF THE INVENTION

The invention relates generally to audio/visual content and more particularly to an apparatus and method for improved real and virtual images.

BACKGROUND OF THE INVENTION

For many applications, virtual reality is the simulation of a real environment. Utilizing virtual reality may be useful for television productions due to a desire for re-creating and replaying various scenes of live events.

Various popular products are available in the marketplace for creating virtual reality effects on personal computers. However, they are limited in creating virtual reality based on real events.

When creating a simulated environment associated with a real event, various physical data may be collected to increase the realism of the simulated environment. For example, a virtual simulation may model a real event such as auto racing. In order to create a virtual race track with virtual race cars, knowing the physical parameters associated with real race cars racing on a real race track may be helpful.

Typical television sport event coverage includes many video cameras covering different parts of the event. Some auto racing events have as many as 20 video cameras covering the race track and are capable of providing a viewpoint from many different directions.

To produce a television program of a live event such as auto racing, a large amount of manual input is typically required to create a television program displaying real scenes captured by one of the real cameras and virtual scenes rendered by a processor.

SUMMARY OF THE INVENTION

The invention illustrates a system and method of processing an instrumentation data stream comprising: a sensor for generating an instrumentation data stream; a data collector configured for receiving the instrumentation data stream; and a normalization module configured for formatting portions of the instrumentation data stream into a common standard.

Other aspects and advantages of the invention will become apparent from the following detailed description, taken in conjunction with the accompanying drawings, illustrated by way of example of the principles of the invention.

DETAILED DESCRIPTION

Specific reference is made in detail to the embodiments of the invention, examples of which are illustrated in the accompanying drawings. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

The invention includes a system and method for generating a virtual mode viewing environment. The invention utilizes techniques for managing and organizing the instrumentation data gathered by video cameras and/or sensors. For the sake of simplicity and clarity, the invention is described with MPEG-2 being chosen as the delivery mechanism. However, any delivery mechanism suitable for use with the invention may be utilized.

Figure 1:
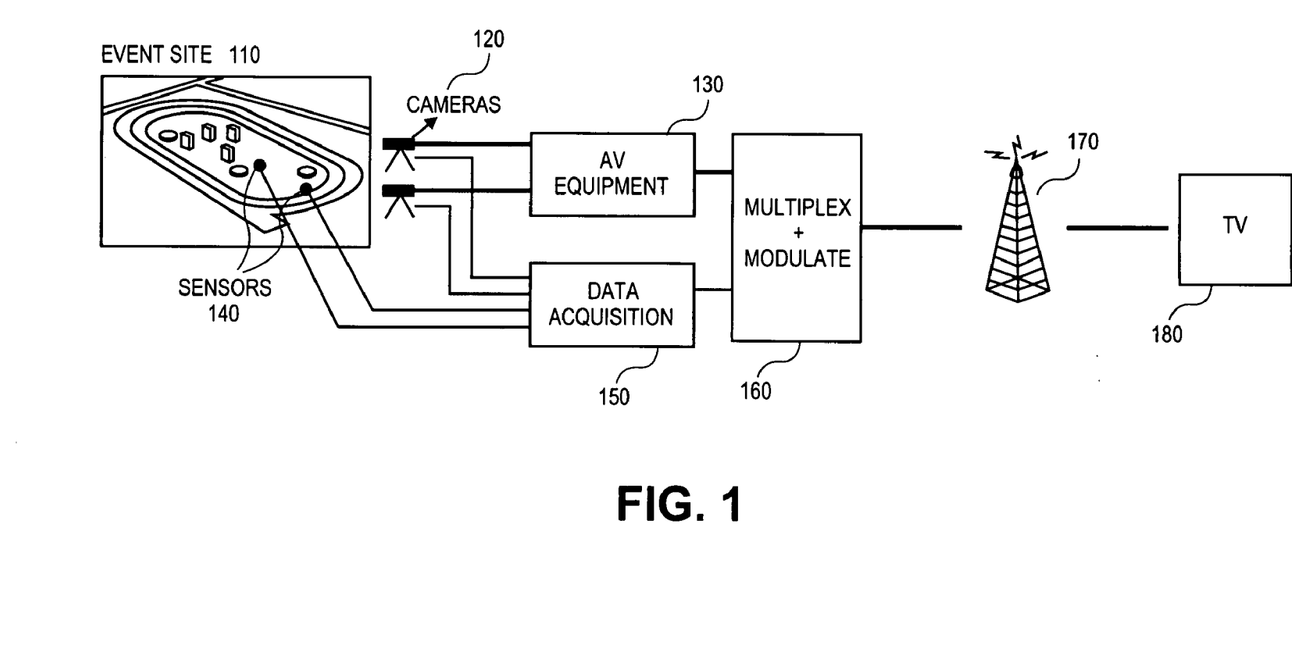
FIG. 1 illustrates one embodiment of a system overview according to the invention.

FIG. 1 illustrates a schematic diagram of one embodiment of a data acquisition and transmission system for use with a digital television system. In this illustrated example, an event occurs at an event site 110. In one embodiment, the event at the event site 110 is an auto racing event. However, any live event such as a sports event, a concert, a theatrical event, and the like may be utilized.

A plurality of cameras 120 is utilized to capture visual and audio signals of the event at the event site 110. In addition, the plurality of cameras 120 also captures camera instrumentation data concurrently with the visual and audio signals. Camera instrumentation data may include, for each video frame, the camera location, tilt, zoom, pan, field of view, focus setting, iris setting, and other information related to the optics of each of the plurality of cameras 120.

A plurality of sensors 140 are utilized within the event site 110 to capture performance instrumentation data. The performance instrumentation data describes the real event at the event site 110. The plurality of sensors 140 may capture the performance instrumentation data concurrently with the data camera instrumentation data captured by the plurality of cameras 120. In this example of a car racing event, each racecar may utilize a global positioning satellite unit as one of the plurality of sensors 140 to provide the performance instrumentation data in the form of the position related to the racecar. In another embodiment, one of the plurality of sensors 140 may include force sensor within each racecar provide the performance instrumentation data in the form of the force exerted on the racecar. These specific examples of the plurality of sensors 140 are shown for exemplary purposes only. Any type of sensor used to measure a physical aspect of the event at the event site 110 may be utilized.

An audio/visual equipment module 130 is configured to process the audio visual signals. In one embodiment, the audio/visual equipment module 130 is configured to receive the audio/visual signals from the plurality of cameras 120.

A data acquisition module 150 is configured to process instrumentation data. In one embodiment, the data acquisition module 150 is configured to receive the camera instrumentation data from the plurality of cameras 120 and the performance instrumentation data from the plurality of sensors 140. Thus, the performance data collected in the data acquisition module 150 includes both the camera instrumentation data which relates to particular parameters associated with the plurality of cameras 120 while recording the event and the performance instrumentation data which relates to data captured by the plurality of sensors 140 which describes aspects of the event.

The multiplex and modulate module 160 is configured to receive the audio visual signals from the audio visual equipment module 130 and the instrumentation data from the data acquisition module 150. In one embodiment, the module 160 is configured to multiplex and modulate the audio visual signals with the instrumentation data into a unified signal relative to time. A transmitter module 170 is configured to receive the unified signal from the multiplex and modulate module 160 and to transmit this unified signal. A television 180 a shown as an exemplary device to receive the unified signal via the transmitter module 170.

Figure 2:
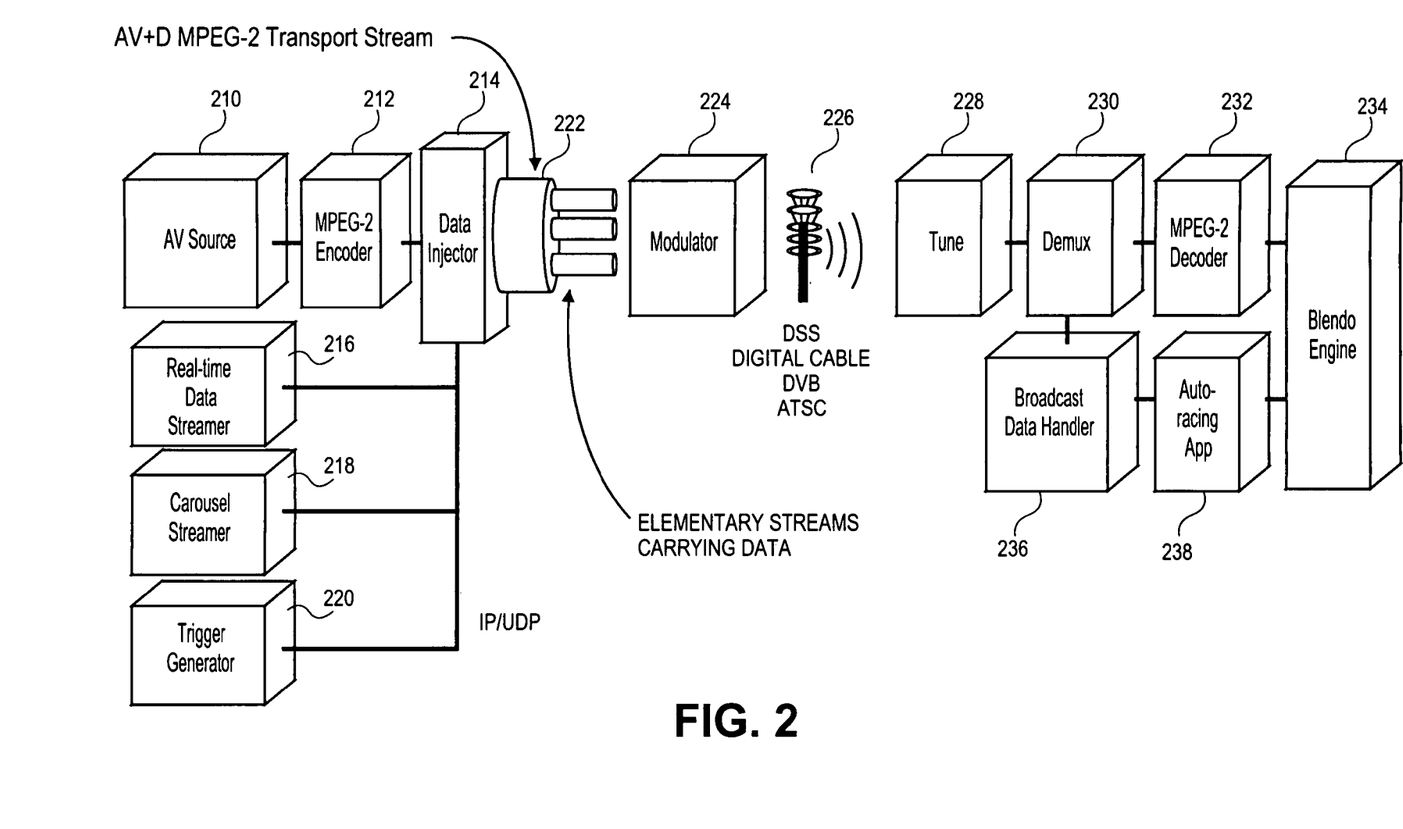
FIG. 2 illustrates one embodiment of a system overview according to the invention.

With reference to FIG. 2, a system 200 is shown for acquiring and processing both audio and video signals of an event and corresponding instrumentation data which describes physical parameters of the event according to one embodiment of the invention. In one example within the context of auto racing, the instrumentation data may include car speed, engine performance, physical location of the car, forces applied to the car, and the like. In other embodiments, the instrumentation data will vary with the specific application of the invention.

The instrumentation data corresponds with the audio and video signals in real time; the instrumentation data and the audio and video signals are temporally correlated. In one embodiment, they are temporally correlated by the use of timestamps. In another embodiment, they may be temporally correlated by relative signal timing.

In one embodiment, the system 200 includes an audio/visual (A/V) source 210, an MPEG-2 encoder 212, a data injector 214, a real-time data streamer 216, a carousel streamer 218, a trigger generator 220, an A/V and data transport stream 222, a modulator 224, a transmitter 226, a tuner 228, a demultiplexer 230, an MPEG-2 decoder 232, a presentation engine 234, a broadcast data handler 236, and an application module 238. Additional specific elements common in computer system such as processors, memory, user interfaces, system busses, storage devices, and the like are not shown to prevent unnecessarily obscuring the aspects of the invention.

The components 210-238 are merely illustrated in FIG. 2 as one embodiment of the system 200. Although the components 210-238 are illustrated in FIG. 2 as separate components of the system 200, two or more of these components may be integrated, thus decreasing the number of components in the system 200. Similarly, the components 210-238 may also be separated, thus increasing the number of components within the system 200. Further, the components 210-238 may be implemented in any combination of hardware, firmware and software.

The A/V source 210 is connected to the MPEG-2 encoder 212 and provides the MPEG-2 encoder with A/V content. In one embodiment, the A/V source 210 includes a video camera. However, in another embodiment, the A/V source 210 may also include a video cassette recorder, a digital recorder, or other means for providing A/V content. The MPEG-2 encoder 212 receives the A/V content and encodes this content to form an encoded A/V data stream according to the MPEG-2 standard which is well known in the art. In other embodiments, other A/V encoders such as MPEG-1 or MPEG-4 may be utilized.

The MPEG-2 encoder 212, the real-time data streamer 216, the carousel streamer 218 and the trigger generator 220 are connected to the data injector 214. The real-time data streamer 216 provides the data injector 214 with instrumentation data which describes and corresponds in real-time with the A/V content from the A/V source 110. Instrumentation data describes in real-time physical aspects or conditions that correspond with the A/V content.

The carousel streamer 218 provides the data injector 214 with assets (e.g., images, audio clips, text files) related to the user interface. The trigger generator 220 provides the data injector 214 with data used to activate predefined actions on the receiver (e.g., authored questions for a trivia game or poll, advertisement names for pop-up ad inserts).

The data injector 214 receives incoming data from the MPEG-2 encoder 212, the real-time data streamer 216, the carousel streamer 218, and the trigger generator 220. The data injector 214 synchronizes the incoming data such that the data from the real-time data streamer 216, carousel streamer 218, and trigger generator 220 are timed with the corresponding encoded A/V data stream. The data injector 214 is connected to the A/V and data transport stream 222 and feeds the synchronized data through the A/V and data transport stream 222 to the modulator 224.

The modulator 224 receives the synchronized data. The synchronized data includes the encoded A/V data stream and associated instrumentation data from the real-time data streamer 216, carousel streamer 218, and trigger generator 220. The modulator 224 broadcasts this synchronized data through the transmitter 226. The transmitter 226 may broadcast through air, cable, phone lines, and the like.

In one embodiment, the modulator 224 may further include a data studio to further processes the data from the data injector 214. The data from the data injector 214 includes instrumentation data. Additional details and applications of the data studio are illustrated in the following text and illustrated in the corresponding figures.

The tuner 228 receives the synchronized data which is broadcast through the transmitter 226. The demultiplexer 230 is connected to the tuner 228 and receives the synchronized data from the tuner 228. The demultiplexer 230 separates the encoded A/V data stream from other data originally from the real-time data streamer 216, carousel streamer 218, and trigger generator 220. The MPEG-2 decoder 232 is connected to the demultiplexer 230 and receives the encoded A/V data stream from the demultiplexer 230. The broadcast data handler 236 is connected to the demultiplexer. The data from the real-time data streamer 216, carousel streamer 218, and trigger generator 220, is received by the broadcast data handler 236 from the demultiplexer 230.

The MPEG-2 decoder processes the encoded A/V data stream and returns a decoded A/V data stream which is either identical or nearly identical to the original A/V data stream from the A/V source 210. Similar to the MPEG-2 encoder 212, the MPEG-2 decoder 232 may be substituted with other A/V encoders such as MPEG-1 or MPEG-4. The MPEG-2 decoder 232 is connected with the presentation engine 234. The presentation engine 234 receives the decoded A/V data stream from the MPEG-2 decoder 232.

The broadcast data handler 236 is connected to the application module 138. The broadcast data handler 236 reformats the data from the transport stream into data that the application module 238 can utilize. The data from the real-time data streamer 216, carousel streamer 218, and trigger generator 220 is received by the application module 238. The application module 238 utilizes the data from the real-time data streamer 216, carousel streamer 218, and trigger generator 220. The application module 238 also interacts with the presentation engine 234.

An alternate embodiment, the application module 238 further includes the data studio. In this embodiment, the data studio processes the data from the broadcast data handler 236. The data from the broadcast handler 236 includes instrumentation data. Additional details of the data studio are illustrated in the following text and illustrated in the corresponding figures.

Figure 3:
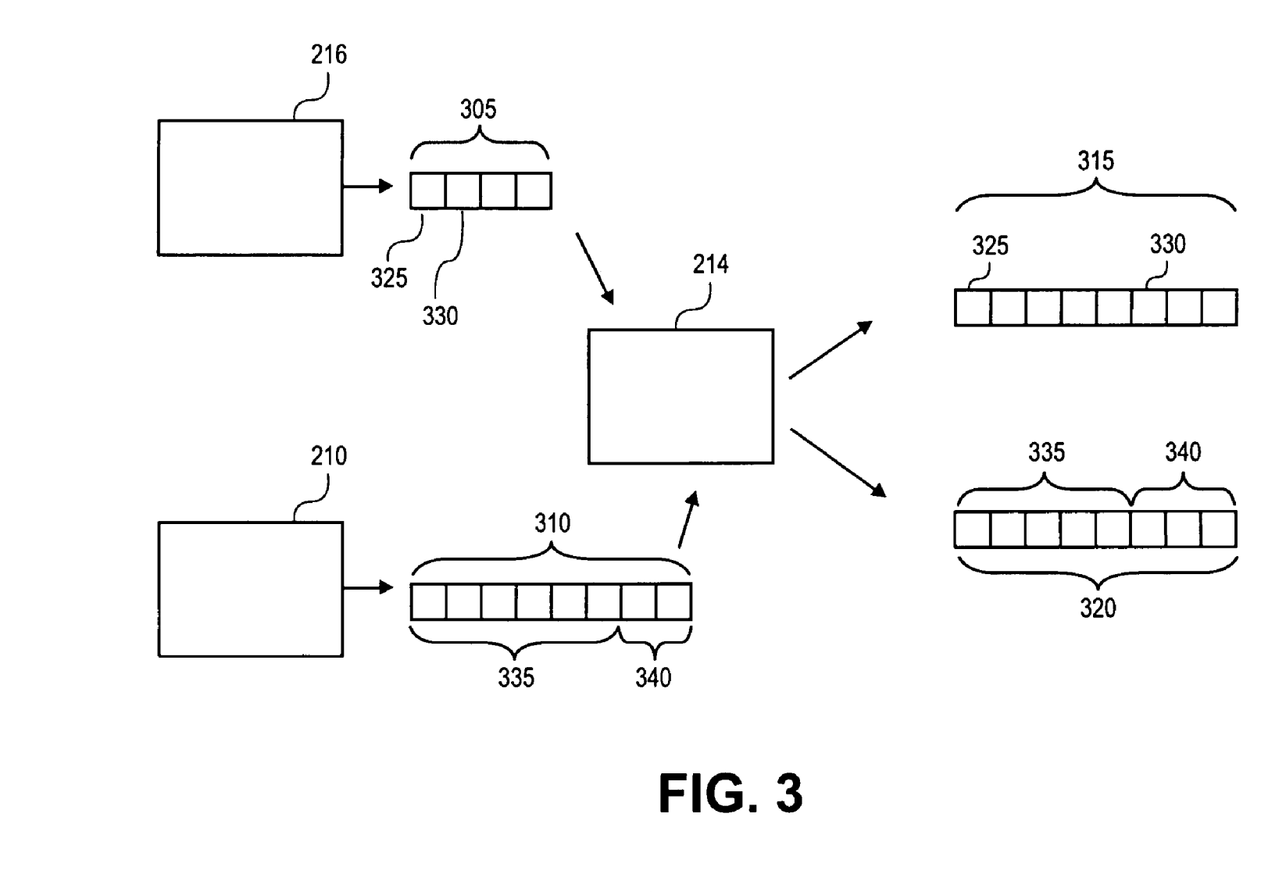
FIG. 3 illustrates an exemplary data flow according to the invention.

FIG. 3 illustrates a data flow diagram showing the data injector 214 according to one embodiment of the invention. The real-time data streamer 216 (FIG. 2) sends a sequence of instrumentation data 305 to the data injector 214 (FIG. 2). The A/V source 210 (FIG. 2) sends a sequence of A/V data 310 to the data injector 214. This sequence of instrumentation data 305 represents data that describes physical parameters related to the sequence of A/V data 310. The segments of the sequence of instrumentation data 305 correspond to specific segments of the sequence of A/V data 310.

In one embodiment, the data injector 214 synchronizes the sequence of instrumentation data 305 and the sequence of A/V data 310 with respect to time. The data injector 214 matches appropriate data from the sequence of instrumentation data 305 to the corresponding segment of the sequence of A/V data 310. The data injector 214 outputs a synchronized instrumentation data stream 315 and a corresponding synchronized A/V data stream 320. The synchronized data stream 315 contains the instrumentation data within the sequence of instrumentation data 305. However, the instrumentation data within the synchronized sensory data stream 315 is timed to correspond appropriate segments within the synchronized A/V data stream 320.

For example, the sequence of instrumentation data 305 includes a first instrumentation data block 325 and a second instrumentation data block 330. Within the sequence of instrumentation data 305, the first instrumentation data block 325 is adjacent the second instrumentation data block 330. In addition, the sequence of A/V data 310 includes a first A/V segment 335 and a second A/V segment 340. After the data injector 214 generates the synchronized instrumentation data stream 315 and the synchronized A/V data stream 320, the first instrumentation data block 325 is no longer adjacent to the second instrumentation data block 330. Within the synchronized instrumentation data stream 315 and the synchronized A/V data stream 320, the first instrumentation data block 325 corresponds with the first A/V segment 335; the second instrumentation data block 330 corresponds with the second A/V segment 340.

Figure 4:
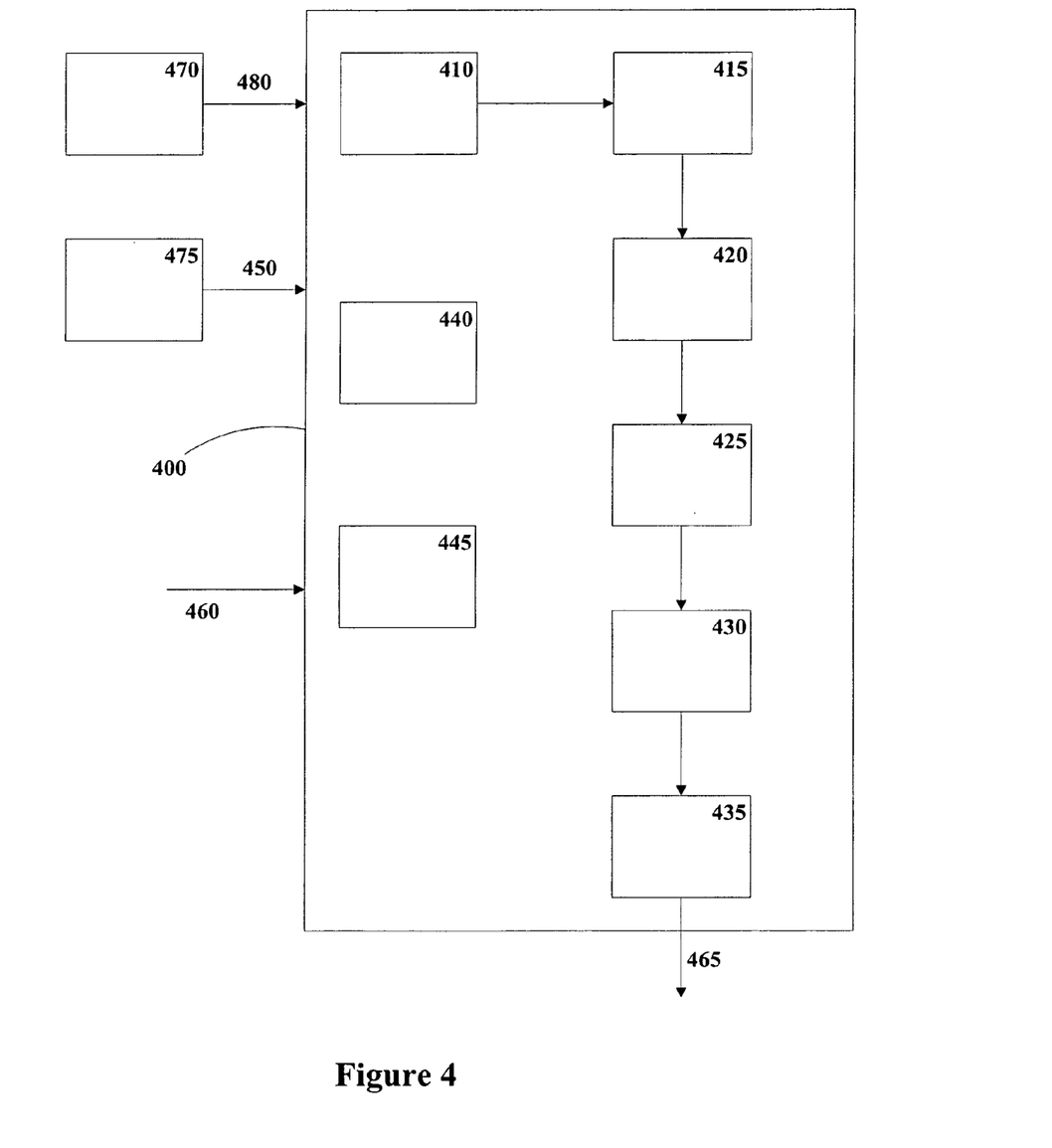
FIG. 4 illustrates an exemplary block diagram of the data studio module according to the invention.

Referring to FIG. 4, a data studio module 400 acquires and processes instrumentation data for the system 200 (FIG. 2). The data studio module 400 is shown interacting with a video source 475 and a sensor module 470 for the sake of clarity. In other embodiments, the data studio module 400 may directly or indirectly interact with other audio and/or visual sources and sensors. In one embodiment, the data studio module 400 includes a data handler 410, a normalization module 415, a stream description module 420, a filtering module 425, a categorization module 430, a multiplexer module 435, a storage module 440, and a control interface 445.

The components 410-445 are merely illustrated in FIG. 4 as one embodiment of the data studio module 400. Although the components 410-445 are illustrated in FIG. 4 as separate components of the data studio module 400, two or more of these components may be integrated, thus decreasing the number of components in the data studio module 400. Similarly, the components 410-445 may also be separated, thus increasing the number of components within the data studio module 400. Further, the components 410-445 may be implemented in any combination of hardware, firmware and software.

The data handler 410 is configured to receive instrumentation data from the sensor module 470 and the video source 475. The data stream 480 represents the performance instrumentation data which is transmitted to the data handler 410 from the sensor 470. The sensor module 470 may include multiple sensors which capture a variety of parameters which correspond to the event. The data stream 450 represents the camera instrumentation data which is transmitted to the data handler 410 from the video source 475. The video source 475 may include multiple video cameras which capture a variety of camera parameters.

The normalization module 415 is configured to receive the instrumentation data from a variety of sensors and/or video sources. The instrumentation data may be provided in different resolutions, reference coordinates, units of measurement. The instrumentation data may also be sampled at different rates depending on the sensor 470 and video source 475. For example, the instrumentation data containing angle measurements which represent tracking data may be provided in terms of degrees and radians. In one embodiment, the normalization module 415 converts and normalizes the angle measurements into a uniform measurement unit of either degrees or radians.

In another embodiment, the normalization module 415 is configured to resample the instrumentation data at a suitable rate. The suitable rate may vary based on the specific requirements of the receiver and transmitter.

The stream description module 420 is configured to describe the instrumentation data. In one embodiment, the stream description module 420 utilizes metadata to describe the particular parameters within the instrumentation data. For example, metadata may contain information such as the number of video cameras being utilized or the units of measurement utilized within the instrumentation data.

The filtering module 425 is configured to selectively remove portions of the instrumentation data. The instrumentation may include large volumes of both performance instrumentation data and camera instrumentation data. In one embodiment, the filtering module 425 allows specific types of instrumentation data to be utilized by the data studio 400 in response to selected preferences. In another embodiment, the filtering module 425 removes specific types of instrumentation data to from being utilized by the data studio 400 in response to selected preferences. These selected preferences may be influenced by bandwidth limitations and/or the type of instrumentation needed.

In another embodiment, the filtering module 425 is configured to extrapolate the instrumentation data when there is a lapse of continuity in the instrumentation data. By extrapolating the instrumentation data, the filtering module 425 is configured to fill in the missing sections of the instrumentation data. The instrumentation data may be interrupted due to a faulty sensor, a sensor out of range, or a lost instrumentation data transmission.

The categorization module 430 is configured to allow either manual or automatic rule-based categorization of the instrumentation data. In one embodiment, the processing, storage, and usage of the instrumentation is optimized by categorizing the instrumentation data.

The multiplexer module 435 is configured to combine the instrumentation data from multiple sources into a single instrumentation data stream. In one embodiment, the camera instrumentation data from the video source 475 is multiplexed with the performance instrumentation data from the sensor 470 into a single instrumentation data stream. In other embodiments, multiple camera instrumentation streams from multiple video sources are multiplexed into a single instrumentation data stream. In another embodiment, multiple performance instrumentation streams from multiple sensors are multiplexed into a single instrumentation data stream.

The storage module 440 is configured to record the instrumentation data within the data studio 400 for storage and future playback. In one embodiment, the storage module 440 stores the instrumentation data after being processed by the normalization module 415, the stream description module 420, the filtering module 425, the categorization module 430, and/or the multiplexer module 435. In another embodiment, the storage module 440 stores unprocessed instrumentation data.

The control interface 445 is configured to accept input 460 from a user. The user may configure the video source 475 and/or the sensor 470. The user may also monitor the instrumentation data from the video source 475 and the sensor 470. In one embodiment, the user interfacing with the data studio 400 through the control interface 445 is located on the production or broadcast side. In another embodiment, the user interfacing with the data studio 400 through the control interface 445 is located on the downstream or receiver side.

Figure 5:
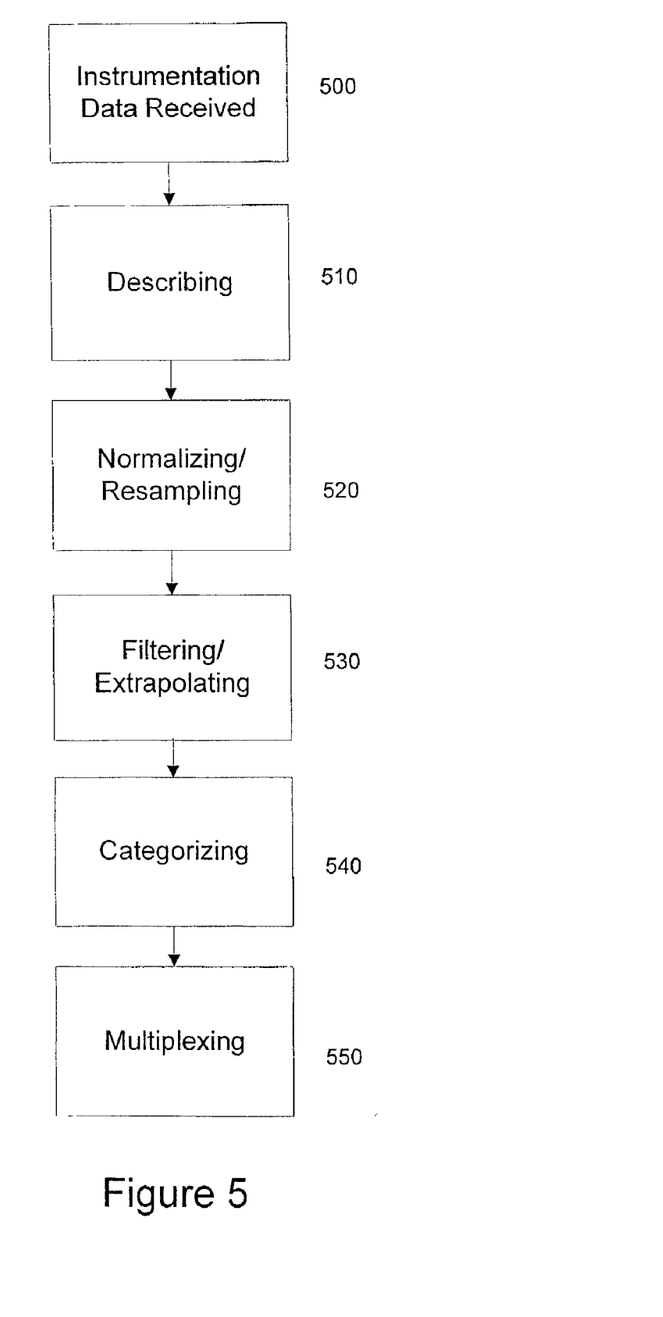
FIG. 5 illustrates an exemplary process flow diagram according to the invention.

The flow diagram as depicted in FIG. 5 is merely one embodiment of the invention. In this embodiment, the flow diagram illustrates the use of the instrumentation data within the data studio 400 (FIG. 4). In this embodiment, the instrumentation data is related to an automotive race application.

The blocks within the flow diagram may be performed in a different sequence without departing from the spirit of the invention. Further, blocks may be deleted, added or combined without departing from the spirit of the invention.

In Block 500, the instrumentation data is received. In Block 510, a description process is applied to the instrumentation data. The description process includes identifying the data type and the identifying units associated with the instrumentation data. For example, the instrumentation data may be described in feet for length, global positioning system coordinates for location, seconds for time, and the like. Meta data describing the structure of the instrumentation data may be inserted into the instrumentation data in the Block 510.

In Block 520, the instrumentation data may be normalized. The normalization may convert the units within the instrumentation data. For example, the measurement of length may be converted from feet into meters. In Block 520, the instrumentation may also be resampled. Resampling the instrumentation data creates a unified data created from a variety of sensors and/or video sources each with their own data rates. Further, resampling the instrumentation data also provides a receiver with an appropriate data rate based on bandwidth transmission limitations, processing limitations, and the like.

In Block 530, the instrumentation data may be extrapolated. The instrumentation data may have transitory failures such as a defective sensor or lost data transmission. The missing portions of the instrumentation data may be replaced with extrapolated data. The extrapolated data may be created in response to a combination of previous instrumentation data and data modeling techniques. The data modeling techniques may be affected by the type of extrapolated data. For example, certain extrapolation data are obtained by physical modeling while other extrapolation data are obtained by statistical modeling. Further, a filtering process may be employed in the instrumentation data to prevent erroneous data from being incorporated within the instrumentation data.

In Block 540, the instrumentation may be categorized. Certain types of instrumentation data have higher priorities. By categorizing the instrumentation data, the receiver of the instrumentation data is assisted in locating specific instrumentation data. In one embodiment which places high priority on vital statistics for a specific car, car positioning data, engine performance, gear selection, and the like are singled out as being very important in this application. The categorization may take manual form with a user guiding the categorization or may be automatic which is guided by a rule-based categorization.

In Block 550, the instrumentation data and the video data are multiplexed together and is ready to be sent through a transmitter.

The foregoing descriptions of specific embodiments of the invention have been presented for purposes of illustration and description. For example, the invention is described within the context of auto racing and football as merely embodiments of the invention. The invention may be applied to a variety of other theatrical, musical, game show, reality show, and sports productions.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. An apparatus comprising:
   a sensor for generating a performance instrumentation data stream, wherein the performance instrumentation data stream comprises measurement data for a real event;
   a data collector configured for receiving the performance instrumentation data steam;
   a normalization module configured for formatting portions of the performance instrumentation data stream into a common standard;
   a stream description module configured for adding a meta data tag to the performance instrumentation data stream, wherein the meta data tag describes a data type within the performance instrumentation data stream;
   a filtering module configured for selectively removing portions of the performance instrumentation data stream;
   a categorization module for grouping segments of the performance instrumentation data stream based on a description of each of the segments of the performance instrumentation data stream; and
   a multiplexer module configured for combining the performance instrumentation data stream with a corresponding video data stream for the real event.

2. The apparatus according to claim 1 wherein the common standard is a measurement in a common unit of measurement.

3. The apparatus according to claim 2 wherein the common unit of measurement is one of the temperatures, velocities, distances, forces, and angles.

4. The apparatus according to claim 1 wherein the normalization module is configured to resample the performance instrumentation data stream into a single data rate.

5. The apparatus according to claim 1, wherein the filtering module is further configured for generating extrapolation data for incorporation within the performance instrumentation data stream to replace a defective portion of the performance instrumentation data stream.

6. The apparatus according to claim 1 wherein the sensor is incorporated within a video camera.

7. The apparatus according to claim 1 wherein the sensor captures one of the plurality of positional data and force data.

8. A method comprising:
  receiving a performance instrumentation data stream from a plurality of sensors, wherein the performance instrumentation data stream comprises measurement data for a real event;
  generating a modified performance instrumentation data stream in response to receiving the performance instrumentation data stream, wherein generating comprises:
    normalizing the performance instrumentation stream data into a common standard,
    adding a meta data tag to the performance instrumentation data stream, wherein the meta data tag describes a data type within the performance instrumentation data stream,
    selectively removing portions of the performance instrumentation data stream,
    categorizing segments of the performance instrumentation data stream based on a description of each of the segments of the performance instrumentation data stream, and
    multiplexing the performance instrumentation data stream with a corresponding video data stream for the real event; and
  transmitting the modified performance instrumentation data stream.

9. The method according to claim 8 wherein the common standard is a measurement in a common unit of measurement.

10. The method according to claim 8, wherein normalizing further comprises resampling the performance instrumentation data stream into a single data rate.

11. The method according to claim 8, wherein the filtering further comprises generating extrapolation data for incorporation within the performance instrumentation data stream to replace a defective portion of the performance instrumentation data stream.

12. A computer-readable storage medium having stored thereon a computer executable instructions for performing a method comprising:
  receiving a performance instrumentation data stream from a plurality of sensors, wherein the performance instrumentation data stream composes measurement data for a real event;
  generating a modified performance instrumentation data stream in response to receiving the instrumentation data stream, wherein generating comprises:
    normalizing the performance instrumentation stream data into a common standard,
    adding a meta data tag to the performance instrumentation data stream, wherein the meta data tag describes a data type within the performance instrumentation data stream,
    selectively removing portions of the performance instrumentation data stream,
    categorizing segments of the performance instrumentation data stream based on a description of each of the segments of the performance instrumentation data stream, and
    multiplexing the performance instrumentation data stream with a corresponding video data stream for the real event; and
  transmitting the modified performance instrumentation data stream.

* * * * *